(12) United States Patent
Droemer

(10) Patent No.: US 8,550,348 B2
(45) Date of Patent: Oct. 8, 2013

(54) OPTOELECTRONIC DEVICE

(75) Inventor: Joerg Droemer, Bad Urach-Wittlingen (DE)

(73) Assignee: Leuze Electronic GmbH + Co. KG, Owen/Teck (DE)

( * ) Notice: Subject to any disclaimer, the term of this patent is extended or adjusted under 35 U.S.C. 154(b) by 68 days.

(21) Appl. No.: 13/085,940

(22) Filed: Apr. 13, 2011

(65) Prior Publication Data

US 2011/0248086 A1  Oct. 13, 2011

(30) Foreign Application Priority Data

Apr. 13, 2010 (DE) .................. 10 2010 014 783

(51) Int. Cl.
 *G06K 7/10* (2006.01)
(52) U.S. Cl.
 USPC ............... 235/454; 235/462.32; 235/462.35; 250/225; 359/485.02; 359/489.19
(58) Field of Classification Search
 USPC ............... 235/462, 472, 454, 462.32, 435, 235/472.03, 491, 462.35; 359/241, 317, 359/359, 487.02, 489.15, 489.19, 504, 589, 359/485.02; 356/73.1, 491; 250/221, 225, 250/364; 382/101, 103
 See application file for complete search history.

(56) References Cited

U.S. PATENT DOCUMENTS

| | | | | |
|---|---|---|---|---|
| 5,210,548 A | * | 5/1993 | Grabowski | 347/241 |
| 6,017,125 A | * | 1/2000 | Vann | 359/529 |
| 2003/0035972 A1 | * | 2/2003 | Hanson et al. | 428/480 |
| 2007/0188864 A1 | * | 8/2007 | Duncan et al. | 359/495 |
| 2008/0049584 A1 | * | 2/2008 | Tan et al. | 369/112.16 |

* cited by examiner

*Primary Examiner* — Michael G Lee
*Assistant Examiner* — Tabitha Chedekel
(74) *Attorney, Agent, or Firm* — Venable LLP; Robert Kinberg

(57) ABSTRACT

An optoelectronic device for detecting marks with defined contrast patterns includes a transmitter to emit polarized light beams, a receiver to receive light beams and having an output to produce receiving signals representing the received light beams, and a an evaluation unit to which the receiving signals are fed and in which the contrast pattern of a mark is detected with the aid of the receiving signals present at the receiver output. A thin-film polarization filter is arranged in front of the receiver to filter out a share of the received light beams specular reflected back by the mark.

9 Claims, 2 Drawing Sheets

OPTOELECTRONIC DEVICE

CROSS-REFERENCE TO RELATED APPLICATION

This application claims the priority of German Patent Application DE 10 2010 014 783.4, filed on Apr. 13, 2010, the subject matter of which is incorporated herein by reference.

BACKGROUND OF THE INVENTION

The invention relates to an optoelectronic device for detecting marks with defined contrast patterns. Such a device includes a transmitter to emit light beams, a receiver to receive light beams and an evaluation unit to which receiving signals from the receiver output are fed and in which the contrast pattern of a mark is detected with the aid of the receiving signals.

Optoelectronic devices of this type are notably embodied as barcode readers for detecting barcodes. In particular, these barcode readers are scanners for which the light beams emitted by the transmitter are periodically conducted over a scanning region with the aid of a deflection unit. The light beams reflected back by the mark to be detected, notably the barcode, have an amplitude modulation that corresponds to the contrast pattern of the mark. This amplitude modulation is evaluated in the evaluation unit for the optoelectronic device in order to decode the mark, in particular the barcode.

Extremely smooth surfaces represent a problem during the detection of marks of this type. Examples for this are barcodes used to characterize blood samples in test tubes or the like. In that case, the problem occurring is that if the transmitted light beams are oriented toward the mark so that the light beams, which are reflected back by the mark in a mirror-type or specular reflection, directly impinge on the receiver, the amplitudes of the received light beams are large enough so that the receiver is blinded and the mark consequently cannot be detected.

To counter this problem, the use of transmitters is known which operate with linear polarized light. In addition, a polarization filter consisting of a plastic film is installed in front of the receiver. For the most part, the undesirable specular reflections of the mark can be filtered out with a polarization arrangement of this type, so that essentially only diffuse light which is reflected back by the mark must be evaluated.

However, it has turned out that the filtering with polarization filters composed of plastic films is strongly dependent on the wavelengths, so that the specular reflections are filtered out in an unsatisfactory manner, depending on the wavelength range of the transmitted light beams.

SUMMARY OF THE INVENTION

It is an object of the present invention to provide an optoelectronic device of the aforementioned type which has a higher functionality with the simplest possible design.

The above and other objects are accomplished by the invention wherein there is provided according to one embodiment, an optoelectronic device for detecting marks with defined contrast patterns, comprising: a transmitter to emit polarized light beams; a receiver to receive light beams and having an output to produce receiving signals representing the received light beams; an evaluation unit to which the receiving signals are fed and in which the contrast pattern of a mark is detected with the aid of the receiving signals present at the receiver output; and a thin-film polarization filter arranged in front of the receiver to filter out a share of the received light beams specular reflected back by the mark.

With the optoelectronic device according to the invention, marks and in particular barcodes which have smooth surfaces can be detected securely, wherein it is especially advantageous that the optoelectronic device can also be oriented, relative to the mark, such that it is arranged in the direction of the received light beams which are specular reflected, meaning mirror-reflected, by the mark.

The use of the thin-film polarization filter installed in front of the receiver makes it possible to filter out the polarized, notably linear polarized, transmitted light beams which are reflected back specular by the mark and are conducted as received light beams in the direction of the receiver. In addition, the filtering occurs with considerably higher efficiency than would be the case when using a polarization filter composed of a plastic film.

In contrast to polarization filters consisting of plastic film, which obtain their polarization effect through an arrangement of elongated plastic threads, the polarization effect of the thin-film polarization filter is achieved with the aid of a multilayer arrangement of thin films. A thin-film polarization filter of this type generates a polarization effect for which the transmission of the light parallel and perpendicular to the plane of incidence for the light beams is different.

This effect is utilized according to the invention in that the thin-film polarization filter arranged in front of the receiver is oriented so that the angle of incidence for the received light beams is in the range of the Brewster angle for the thin-film polarization filter.

Owing to this arrangement, the transmitted light, which is reflected back specular by the mark and which retains a polarization state, is filtered out completely in the aforementioned relevant wavelength range for the transmitted light beams. In contrast, the polarization state of the share of transmitted light that is reflected back diffuse by the mark is changed, that is to say this share of the transmitted light is depolarized. The diffuse reflected share of the light consequently travels for the most part through the thin-film polarization filter to the receiver and can thus be used for detecting the mark.

In one embodiment the thin-film polarization filter may be positioned in the optoelectronic device so that it forms a beam divider for dividing the transmitted light beams and the received light beams. A compact configuration is thus possible for the optoelectronic device, in particular for the case where the transmitted light beams are deflected with the aid of a rotating polygonal mirror, so that these are periodically conducted over a scanning region. The transmitted light beams reflected back by a mark as received light beams are conducted via the rotating polygonal mirror to the receiver, wherein the thin-film polarization filter is arranged between the rotating polygonal mirror and the receiver.

Alternatively, the optoelectronic device may be embodied as a video sensor. In that case, a lighting unit functions as the transmitter and a camera functions as the receiver.

The camera can be embodied as a matrix-type CMOS or CCD array. With this embodiment no moving parts are required for deflecting the beams.

In contrast to the known polarization filters composed of a plastic film, specular reflections can be suppressed over a broad wavelength range of the transmitted light beams with the use of the thin-film polarization filter according to the invention. This is true in particular if the transmitter is embodied as a laser which emits light beams in the blue wavelength range or in general for transmitters which emit light beams in the wavelength range of about 350 nm to about 480 nm.

A considerably slower beam expansion occurs with increasing distance of the transmitted light beams to the focal plane when using light transmitted in the blue wavelength range as compared to the transmitters used so far, which emit light beams in the red or infrared wavelength range. As a result, the beam diameter of the transmitted light beams is still small enough to ensure a secure detection of the marks even at longer distances to the focal plane. Thus, a useful reading range of the device is increased when using a transmitter that emits light in the blue wavelength range.

According to another embodiment the transmitter may be embodied as a semiconductor element, for example, a laser diode or a light-emitting diode, thus permitting a simple and space-saving installation of the transmitter in the device. No additional structural expenditure is required, in particular, when using these types of transmitters, as compared to transmitters emitting light in the red or infrared range.

Furthermore, use of transmitted light in the blue wavelength range, instead of the red wavelength range, permits a reduction of the so-called speckle noise described, for example, in German patent document DE 100 56 232. An improved signal to noise ratio is thus obtained when scanning the marks.

BRIEF DESCRIPTION OF THE DRAWINGS

These and other features and advantages of the invention will be further understood from the following detailed description with reference to the accompanying drawings.

DETAILED DESCRIPTION

Figure 1:
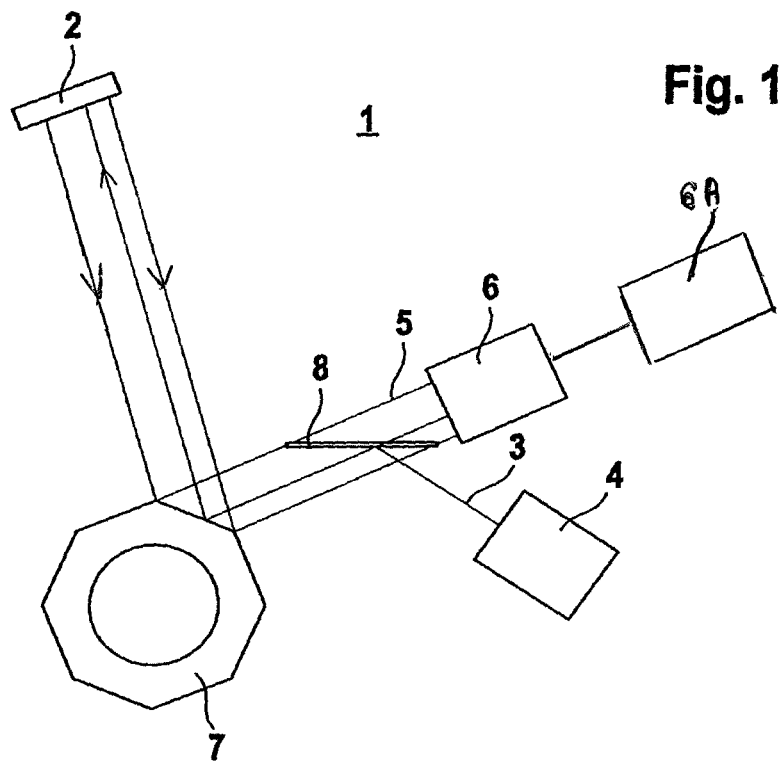
FIG. 1 is a schematic representation of a first embodiment of the optoelectronic device according to the invention.

FIG. 1 shows the basic configuration of an embodiment of an optoelectronic device 1 according to the invention for detecting marks with defined contrast patterns. In principle, the marks can comprise optional sequences and shapes consisting of bright surfaces and dark surfaces, arranged adjacent to each other, preferably black and white surfaces. In the following, the invention is explained for the case where the marks represent barcodes 2. The barcodes 2 essentially consist of an alternating sequence of light and dark, preferably black and white, line elements of a defined length and width.

The optoelectronic device 1 comprises a transmitter 4 for emitting the light beams 3 and a receiver 6 for receiving the light beams 5. A transmitting optics, not shown herein, is advantageously assigned to the transmitter 4 while a receiving optics is correspondingly assigned to the receiver 6. The transmitting optics and the receiving optics can respectively be a lens. The transmitter 4 emits light beams 3 in the blue wavelength range. The central wavelength of the transmitter 4, at which the maximum transmission occurs, is preferably in the wavelength range of about 350 to about 480 nm. The transmitter 4 may be embodied as a laser diode or as a light-emitting diode. Depending on its embodiment, the transmitter 4 can emit only blue light or, alternatively, the transmitter 4 may also emit over a broad wavelength range which is partially located in the green or the near ultraviolet range. It is advantageous in that case if color filters are arranged downstream of the transmitter 4, for example for filtering out the shares of the transmitted light in the green wavelength range.

Using transmitters 4 which emit in the blue wavelength range makes it possible for the device 1 to read over a broad reading range. The transmitted light beams 3 are deflected with the aid of a deflection unit, which in the present case is a rotating polygonal mirror 7, and are conducted over the barcode 2 to be detected. The axis f rotation for the rotating polygonal mirror is arranged perpendicular to the equatorial plane of the rotating polygonal mirror, shown in FIG. 1.

The light beams 5, received and reflected back by the barcode 2, are conducted via the rotating polygonal mirror 7 to the receiver 6. The receiver 6 may be embodied as a photodiode in which the light beams 5 are converted to an analogous electronic receiving signal.

The receiving signals present at the receiving element output are supplied to an evaluation unit 6A which may be embodied, for example, as a microcontroller.

In the evaluation unit 6A, the analogous receiving signals are converted to a binary signal sequence, for example with the aid of a threshold value unit. To detect a barcode 2, this signal sequence is compared to a signal sequence already stored in the evaluation unit which corresponds to the contrast pattern of the barcode 2.

A thin-film polarization filter 8 is arranged in the beam path for the transmitted light beams 3 and the received light beams 5, wherein this filter not only has the polarization of the transmitted light beams 3 and the received light beams 5, but also functions as beam divider for the transmitted light beams 3 and the received light beams 5. The thin-film polarization filter 8 may be composed of a multiple arrangement of thin layers, preferably vapor-deposited onto a substrate, which respectively form polarizing elements for the incident light. The thin-film polarization filter 8 embodied in this way has different polarization for σ-polarized light, meaning light which is polarized perpendicular to the plane of incidence for the light, and for π-polarized light, meaning light polarized parallel to the plane of incidence for the light. The thin-film polarization filter 8 is arranged in such a way in the beam path that the angle of incidence for the light beams 5 arriving on the thin-film polarization filter 8 is at least approximately equal to the Brewster angle for the thin-film polarization filter. In the process, the receiver 6 is arranged at a far enough distance from the rotating polygonal mirror 7, so that the received light beams 5 are conducted approximately parallel when they arrive on the thin-film polarization filter 8 and so that the total bundle composed of received light beams 5 arrives at the Brewster angle on the thin-film polarization filter 8. The light beams 3 emitted by the transmitter 4 are polarized linear and perpendicular to the plane of incidence on the thin-film polarization filter 8, meaning the transmitter 4 emits σ-polarized light. A polarization filter, not shown herein, which is directly assigned to the transmitter 4 can be used for this. The thin-film polarization filter 8 makes it possible that only π-polarized light arrives at the receiver 6.

The arrangement, shown in FIG. 1, of the thin-film polarization filter 8 according to the invention in the beam path of the transmitted light beams 3 and the received light beams 5 results in only the share of the received light which is reflected back diffuse by the barcode 2, but not the specular-reflected share of the light, travels to the receiver 6.

Figure 2:
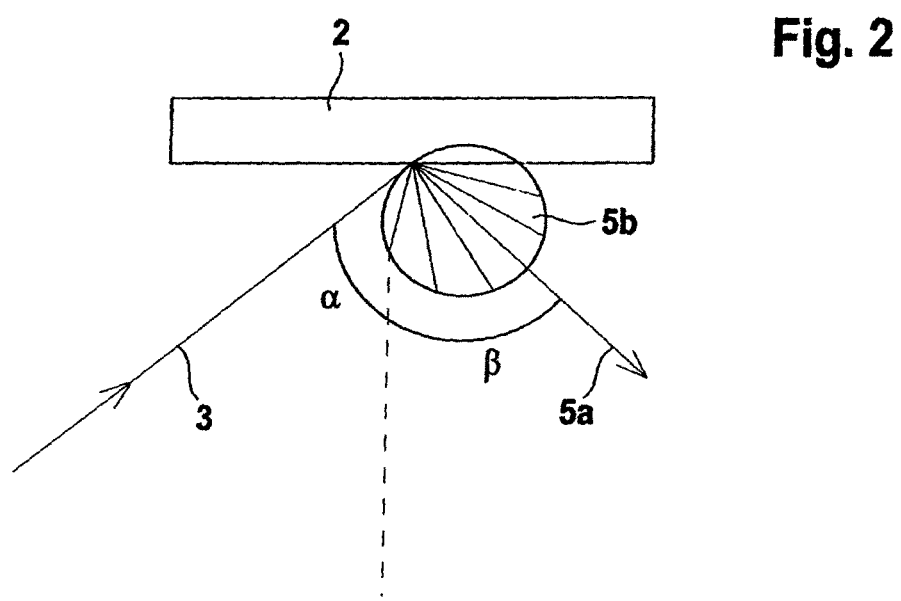
FIG. 2 is a diagram showing distribution of diffuse and specular reflected shares of the transmitted light beams impinging on a barcode.

The differently reflected shares of the received light beams 5 are illustrated in FIG. 2. FIG. 2 shows the transmitted light beams which impinge with a specific angle of incidence on a barcode 2. At the barcode 2, a share of the transmitted light beams 3 is reflected back specular in the form of received light beams 5a, meaning at a reflection angle β, wherein the reflection angle β corresponds to the angle of incidence α. The remaining share of the transmitted light beams 3 is reflected back diffuse in the form of received light 5b at a second angle of reflection.

The share of the specular reflected light is extremely high when using barcodes 2 with smooth surfaces, in particular barcodes used for characterizing blood samples in test tubes. If the optoelectronic device 1 is oriented perpendicular to the barcode, the high share of specular reflected light is reflected back directly to the receiver 6. As a result, the receiver 6 is blinded and can no longer read the barcode.

This undesirable effect is avoided with the arrangement according to the invention, as shown in FIG. 1. Owing to the special characteristics of the thin-film polarization filter, which has a different transmission rate for the n-polarized light and the σ-polarized light, the share for the received light 5a that is reflected specular by the barcode 2 is filtered out completely in the thin-film polarization filter 8 and thus cannot blind the receiver 6. The filtering effect results from the physical characteristics of the thin-film polarization filter 8 and its specific orientation in the beam path of the transmitted light beams 3 and the received light beams 5. The thin-film polarization filter 8 thus has a high reflectivity of >90% for the incident σ-polarized transmitted light beams 3, but also has a >90% transmission rate for the n-polarized shares of the received light beams 5, so that the σ-polarized received light beams 5 are effectively filtered out. Since the σ-polarization of the transmitted light beams 3 is retained in the specular reflected share of the received light beams 5 during the reflection at the barcode 2, but the received light beams 5 which are reflected diffuse at the barcode 2 are depolarized, the specular reflected share of the received light beams 5 is thus filtered out in the thin-film polarization filter 8, but not the diffuse reflected share of the received light beams 5. This is true for a broad wavelength range of the transmitted light beams, in particular also for the transmitted light beams 3 in the blue wavelength range.

Figure 3:
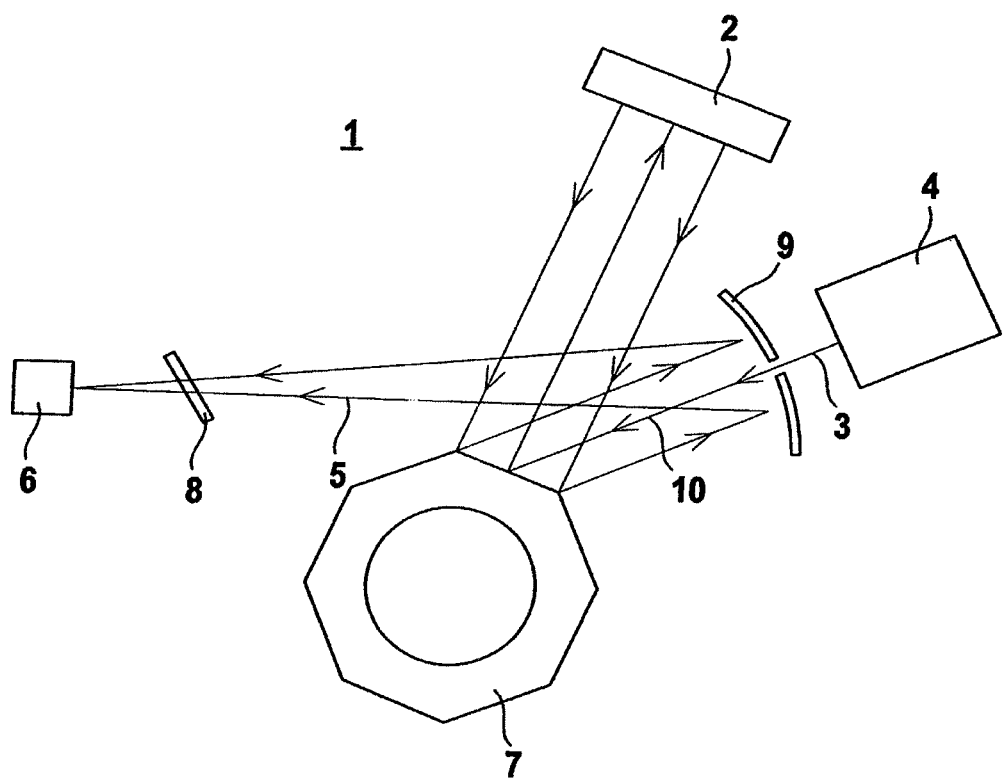
FIG. 3 is a schematic of a second embodiment of the optoelectronic device according to the invention.

FIG. 3 shows a different embodiment of the optoelectronic device 1 according to the invention. The optoelectronic device 1 according to FIG. 3 corresponds to the configuration shown in FIG. 1 insofar as the light beams 3 emitted by the transmitter 4 and the received light beams 5 are conducted over a reflecting rotating polygonal mirror 7, wherein the received light beams 5 arrive at the thin-film polarization filter 8 at an angle that corresponds to the Brewster angle for the thin-film polarization filter. In contrast to the embodiment shown in FIG. 1, however, the embodiment of the thin-film polarization filter 8 shown in FIG. 3 does not function as beam divider. Instead, a concave mirror 9 is provided for deflecting the received light beams 5 in the direction of the receiver 6. The concave mirror 9 contains a central bore 10 through which the transmitted light beams 3 are conducted. This bore consequently takes over the function of an aperture for the transmitted light beams.

It will be understood that the above description of the present invention is susceptible to various modifications, changes and adaptations, and the same are intended to be comprehended within the meaning and range of equivalents of the appended claims.

What is claimed is:

1. An optoelectronic device for detecting marks with defined contrast patterns, comprising:
    a transmitter to emit polarized light beams;
    a receiver to receive light beams and having an output to produce receiving signals representing the received light beams;
    an evaluation unit to which the receiving signals are fed and in which the contrast pattern of a mark is detected with the aid of the receiving signals present at the receiver output; and
    a thin-film polarization filter arranged in front of the receiver to filter out a share of the received light beams specular reflected back by the mark, wherein the thin-film polarization filter is oriented so that the angle of incidence for the received light beams on the filter is in the range of the Brewster angle for the thin-film polarization filter.

2. The optoelectronic device according to claim 1, wherein the transmitter comprises a laser that emits light beams in the blue wavelength range.

3. The optoelectronic device according to claim 1, wherein the transmitter emits light beams in the wavelength range of about 350 nm to about 480 nm.

4. The optoelectronic device according to claim 1, wherein the transmitter emits linearly polarized light beams.

5. The optoelectronic device according to claim 1, wherein the marks are barcodes.

6. The optoelectronic device according to claim 1, further comprising a rotating polygonal mirror arranged to deflect the transmitted light beams, such that deflected light beams are periodically conducted over a scanning range, reflected by the mark and travel back as received light beams that are conducted via the rotating polygonal mirror to the receiver.

7. The optoelectronic device according to claim 6, wherein the thin-film polarization filter is positioned between the rotating polygonal mirror and the receiver.

8. The optoelectronic device according to claim 1, wherein the thin-film polarization filter functions as a beam divider for the transmitted light beams and the received light beams.

9. The optoelectronic device according to claim 1, wherein the transmitter comprises a lighting unit and the receiver comprises a camera.

\* \* \* \* \*